United States Patent [19]

Gasse

[11] 4,265,533

[45] May 5, 1981

[54] APPARATUS FOR THE PRODUCTION OF DUPLICATE, AND OTHER FILMS FROM ORIGINAL FILMS

[75] Inventor: Robert W. Gasse, Burnley, England

[73] Assignee: Hunt & Moscrop (Textile Machinery) Limited, Lancaster, England

[21] Appl. No.: 94,386

[22] Filed: Nov. 15, 1979

[30] Foreign Application Priority Data

Nov. 17, 1978 [GB] United Kingdom ............... 45127/78

[51] Int. Cl.³ ............................................. G03B 27/10
[52] U.S. Cl. ..................................... 355/110; 355/117
[58] Field of Search .................. 355/110, 98, 97, 117, 355/85, 104

[56] References Cited

U.S. PATENT DOCUMENTS

| | | | |
|---|---|---|---|
| 1,682,415 | 8/1928 | Powrie | 355/110 X |
| 1,951,952 | 3/1934 | Sullivan | 355/110 |
| 2,835,180 | 5/1958 | Capstaff | 355/98 X |
| 3,323,434 | 6/1967 | Curtis | 355/98 X |
| 3,479,120 | 11/1969 | Davis | 355/104 X |
| 3,690,766 | 9/1972 | Lunde | 355/110 |
| 3,762,814 | 10/1973 | Kitch | 355/110 X |

Primary Examiner—Richard A. Wintercorn
Attorney, Agent, or Firm—Norris & Bateman

[57] ABSTRACT

Apparatus for the production of duplicate micro and other film from an original film in which the duplicate film of considerably greater length than the original film is housed on a spool in a light tight magazine and fed therefrom through a light trapped slot, the duplicate film and the original film being fed together over a transparent cylinder in a lamp house, an opaque slotted cylindrical sleeve surrounded by the cylinder and a lamp within the sleeve. The films are held in contact with the cylinder by an endless belt driven synchronously with the take up spools for the films, a sensing finger being mounted to engage the original film as it is taken up by the delivery spool to stop the apparatus a predetermined interval after the last image on the film. The duplicate film in the magazine operates a meter to register the length of film remaining on the spool in the magazine.

The provision of the magazine gives a considerable saving in duplicate film as the film is severed as soon as the images on the original film stop irrespective of whether the whole length of original film contains exposure.

4 Claims, 5 Drawing Figures

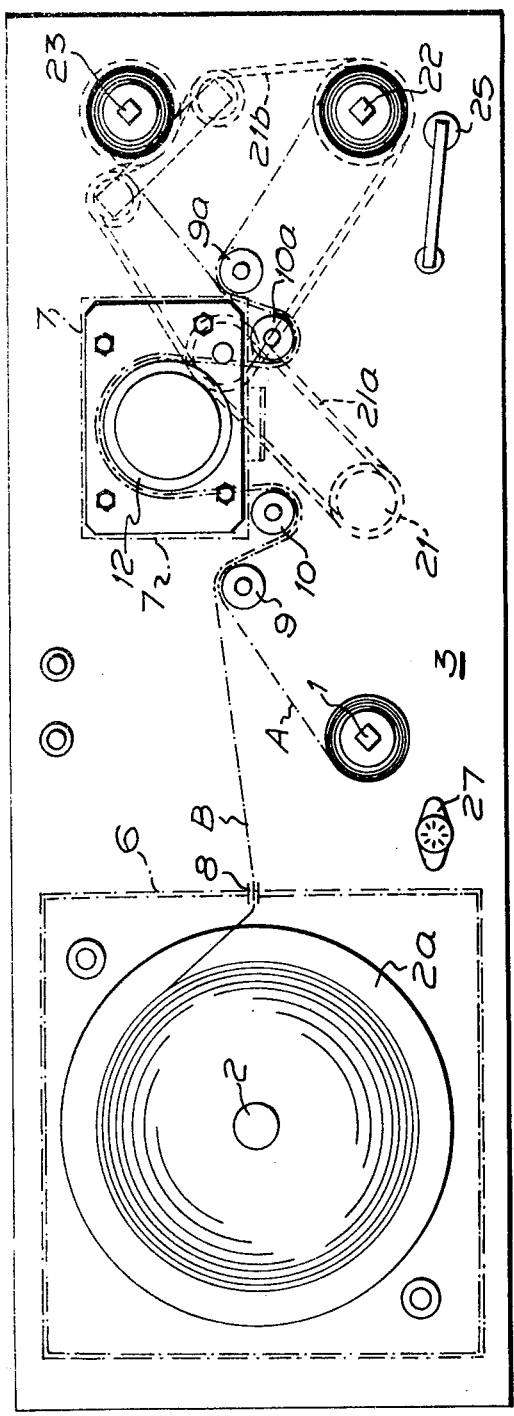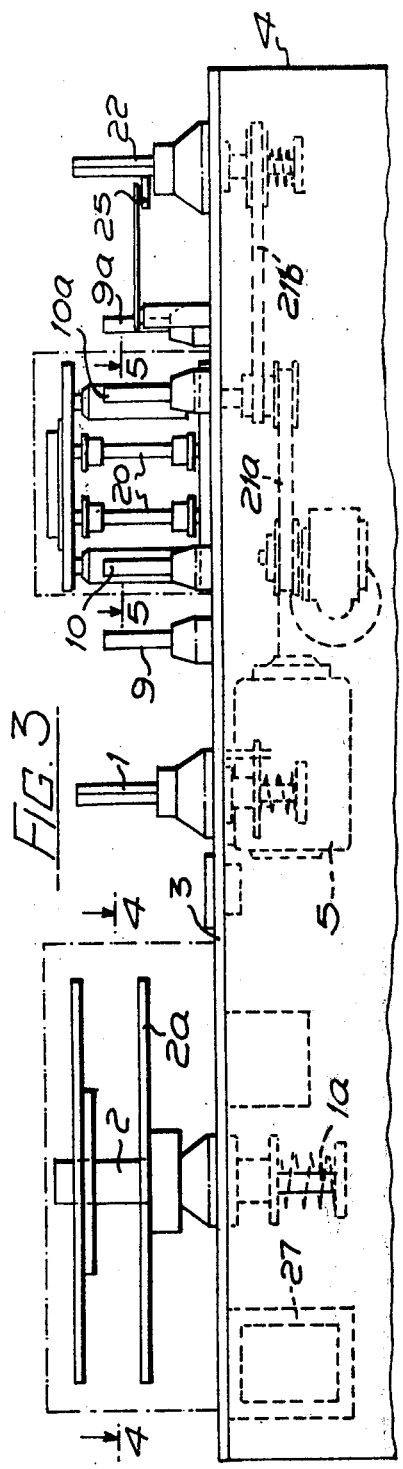
FIG. 2
FIG. 3

APPARATUS FOR THE PRODUCTION OF DUPLICATE, AND OTHER FILMS FROM ORIGINAL FILMS

This invention relates to improvements in apparatus for the production of duplicate micro and other films from original films.

It has been proposed to print a duplicate micro-film from an original film by passing the original film from a feed spool and a duplicate film from a second feed spool in contact with the original film past a lamp to transfer the image from the original film to the duplicate film, the films being drawn from the feed spools and rewound on take up spools driven synchronously, the spools and lamp house being enclosed in a light tight casing and the duplicate films being developed after exposure.

This apparatus has the disadvantage that the original film is nominally 100 or 200 feet in length and the duplicate film is produced in 1000 feet reels from which is cut off 100 or 200 feet for rewinding for the transfer of the images thereon from the original film and as the images on so many films from which the duplicates are made are less than 100 or 200 feet in length there is considerable wasted unused duplicate film.

The object of the invention is the provision of a magazine for the duplicate film capable of housing a spool containing a substantially longer length of film than the original film, means being provided for stopping the original film at the termination of the images thereon and for severing the duplicate film after a further predetermined number of turns of the take up spool.

According to the invention the apparatus comprises a casing housing a feed and take up spool for an original film, a lamp and a lamp-house, a magazine for a duplicate film and a delivery and take up spool therefor, means for driving the take up spool, and an endless belt for driving a transparent cylinder surrounding the lamp for maintaining the films in contact with the cylinder, a slotted sleeve, a meter for registering the length of film in the magazine and a sensor for stopping the apparatus after the last image on the original film has been exposed.

This invention will be described with reference to the accompanying drawings:

FIG. 2 is a plan of same with the cover for the housing for the duplicate film and lamp-house removed:

FIG. 3 is a side elevation of the apparatus:

Figure 1:
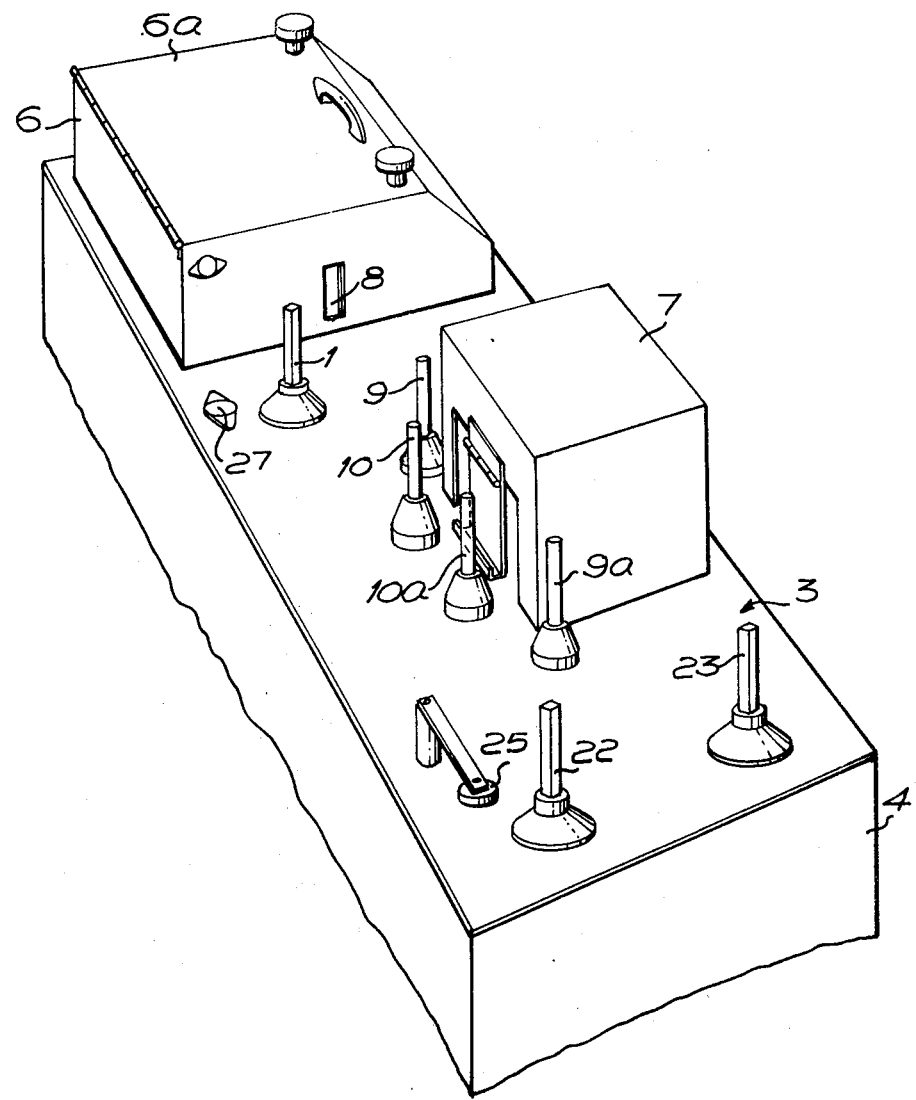
FIG. 1 is a perspective view of the apparatus.
Figure 4:
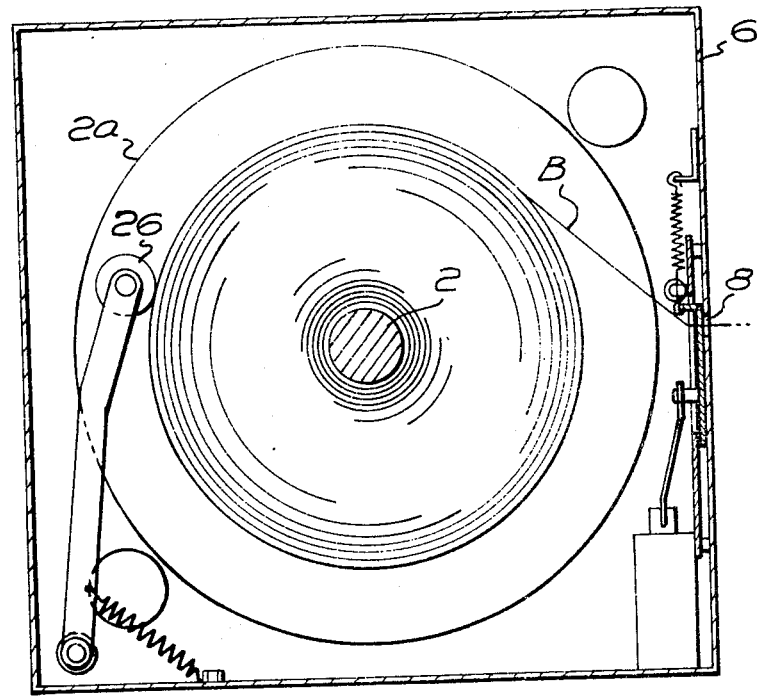
FIG. 4 is a section on line 4—4 FIG. 3.
Figure 5:
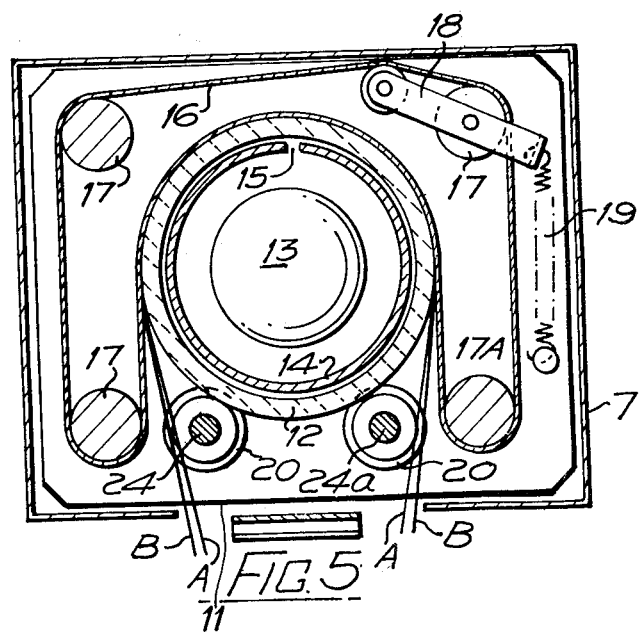
FIG. 5 is a section on line 5—5 FIG. 3.

An original film A on a reel on which images have been developed and a duplicate film B wound on a magazine 2a are mounted on spindles 1,2 respectively on one side of a base board 3.

The spindle 1 passes through the base board 3 and the film is tensioned by a slipping clutch 1a mounted on the opposite or underside of the base board and is enclosed by a casing 4 as hereinafter described.

The duplicate film B is housed in a light tight casing 6 having a hinged lid 6a and a further casing (not shown) encloses the upper side of the base board 3. A lamp-house 7 on the base board 3 encloses a lamp for transferring the images from the original film A on to the duplicate film B.

The duplicate film B from the magazine 2a on the spindle 2 passes through a slot 8 in the casing 6 around guide spindles 9 and 10 and enters the lamp-house. The magazine 2a may contain 1000 feet of film or more.

The original exposed film A is drawn from the spindle 1 which also passes around the guide spindles 9 and 10 and both films enter the lamp house in contact through a slot 11 and pass around a major arc of a transparent cylinder 12 which encloses a lamp bulb 13 and an inner sleeve 14 having a slot 15 therein. The cylinder 12 rests on rollers 20.

An endless belt 16 passes over substantially one half of the periphery of the cylinder 12 and around guide pulleys 17 one of which is mounted on a pivoted arm 18 connected to a spring 19 to apply tension to the belt. The cylinder 12 is rotated by the belt 16 which is driven by spindle 17a. The spindle 17a is driven by a belt 21a from a motor 5. The motor 5 also drives take up spools 22, 23 for the films A and B through a further belt or chain 21b.

The take up spools 22, 23 are rotated synchronously, being driven through the chain 21b and slipping clutches from the driven spindle 17a to accommodate the change in diameter of the spools. The transparent cylinder 12 is rotated by the endless belt 16 in contact therewith, the films being kept in contact with the cylinder by the endless belt to prevent the films from slipping relatively to each other as already described.

A sensing roller 25 is mounted adjacent to the take up spool 22 for the original film A to stop the motor 5 a predetermined interval of time after the last image has been transferred to the film B.

A further sensing roller 26 is mounted in contact with the film B in the magazine casing 6 which operates a meter 27 to register the length of film B remaining on the spool. The exposed film B on the delivery spool 23 is severed and removed from the casing for developing and the magazine 2a itself may be removed and replaced by film material of different characteristics or a magazine containing a film for duplicating of a different width or characteristics as the apparatus will deal with 16 mm or 35 mm negative or positive films.

The introduction of the magazine 2a provides a considerable saving in duplicate film as it can be severed to correspond with the length of exposures on the original film A. The films A and B are prevented from slipping on the cylinder 12 by the endless belt 16 and as the cylinder 12 rotates light passes through the slot 15 to expose the film B which receives the images from the film A.

The films A and B leave the lamp-house through the slot 11 and are wound on to separate take up spools 23, 22.

The films on leaving the lamp-house pass around further guide spindles 10a and 9a on their way to the take up spindles 22, 23.

What I claim is:

1. Apparatus for the production of duplicate micro and other films from original films comprising a base board, a spindle passing through the base board, a spool containing an original developed film mounted on the spindle, a second spindle, a magazine containing a duplicate film mounted thereon of substantially greater length than the original film, a light tight casing enclosing the magazine, a lamp-house surrounding the casing, a lamp in the lamp-house, a transparent cylinder surrounding the lamp and a slotted opaque sleeve interposed between the lamp and the cylinder, an endless belt passing over the cylinder, means for driving the endless belt, the endless belt maintaining the films in contact on the cylinder, a meter for registering the length of film remaining in the magazine, a sensor for activating the meter and a sensor for stopping the apparatus after the last image on the original film has been exposed.

2. Apparatus for the production of duplicate micro films as in claim 1 in combination with a sensing roller contacting the film in the magazine to measure the film as it unwinds and a meter to show the remaining film in the magazine.

3. Apparatus for the production of duplicate micro films as in claim 1 in combination with rollers over which the endless belt passes, and two take up rollers for the two films in which the motor drives the cylinder and the two take up spindles.

4. Apparatus for the production of duplicate micro films as in claim 1 in combination in which the films are kept in contact and with the cylinder by the endless belt to prevent the films from slipping.

* * * * *

UNITED STATES PATENT AND TRADEMARK OFFICE
CERTIFICATE OF CORRECTION

PATENT NO. : 4,265,533
DATED : May 5, 1981
INVENTOR(S) : ROBERT W. GASSE

It is certified that error appears in the above-identified patent and that said Letters Patent are hereby corrected as shown below:

First page of the Patent (Abstract page)

(73) Assignee: "Hunt & Moscrop (Textile Machinery) Limited, Lancaster, England" should be deleted.

Signed and Sealed this

First Day of December 1981

[SEAL]

Attest:

GERALD J. MOSSINGHOFF

*Attesting Officer*     *Commissioner of Patents and Trademarks*

UNITED STATES PATENT AND TRADEMARK OFFICE
CERTIFICATE OF CORRECTION

PATENT NO. : 4,265,533
DATED : May 5, 1981
INVENTOR(S) : ROBERT W. GASSE

It is certified that error appears in the above–identified patent and that said Letters Patent are hereby corrected as shown below:

Claim 1, line 8, after "lamp-house", "surrounding the casing" should be deleted.

Signed and Sealed this

Third Day of August 1982

[SEAL]

Attest:

GERALD J. MOSSINGHOFF

Attesting Officer    Commissioner of Patents and Trademarks

REEXAMINATION CERTIFICATE (198th)
United States Patent [19]

Gasse

[11] B1 4,265,533

[45] Certificate Issued May 22, 1984

[54] APPARATUS FOR THE PRODUCTION OF DUPLICATE, AND OTHER FILMS FROM ORIGINAL FILMS

[76] Inventor: Robert W. Gasse, 36 Fairfield Dr., Burnley, Lancashire, England

Reexamination Request:
No. 90/000,444, Sep. 15, 1983

Reexamination Certificate for:
Patent No.: 4,265,533
Issued: May 5, 1981
Appl. No.: 94,386
Filed: Nov. 15, 1979

Certificate of Correction issued Dec. 1, 1981.

Certificate of Correction issued Aug. 3, 1982.

[30] Foreign Application Priority Data

Nov. 17, 1978 [GB] United Kingdom ............... 45127/78

[51] Int. Cl.³ ............................................. G03B 27/10
[52] U.S. Cl. ..................................... 355/110; 355/117
[58] Field of Search .................. 355/97, 98, 110, 117, 355/104, 85, 90, 111, 106, 108; 242/197

[56] References Cited

U.S. PATENT DOCUMENTS

| | | | |
|---|---|---|---|
| 1,682,415 | 8/1928 | Powrie | 355/110 X |
| 1,951,952 | 3/1934 | Sullivan | 355/110 |
| 2,835,180 | 5/1958 | Capstaff | 355/98 X |
| 3,323,434 | 6/1967 | Curtis | 355/98 X |
| 3,479,120 | 11/1969 | Davis | 355/104 X |
| 3,582,207 | 6/1971 | Johnson | 355/90 |
| 3,603,528 | 9/1971 | Kingsley et al. | 242/197 |
| 3,627,227 | 12/1971 | Foor | 242/197 |
| 3,690,766 | 9/1972 | Lunde | 355/110 |
| 3,704,069 | 11/1972 | Kitch | 355/110 |
| 3,715,159 | 2/1973 | Allport | 355/110 |
| 3,734,617 | 5/1973 | Kitch | 355/111 |
| 3,749,491 | 7/1973 | Maxfield et al. | 355/106 |
| 3,751,165 | 8/1973 | Inoue et al. | 355/108 |
| 3,762,814 | 10/1973 | Kitch | 355/110 X |
| 3,853,401 | 12/1974 | Inoue et al. | 355/106 |
| 4,169,675 | 10/1979 | Roberts | 355/85 |

*Primary Examiner*—Richard A. Wintercorn
*Attorney, Agent, or Firm*—Quaintance & Murphy

[57] ABSTRACT

Apparatus for the production of duplicate micro and other film from an original film in which the duplicate film of considerably greater length than the original film is housed on a spool in a light tight magazine and fed therefrom through a light trapped slot, the duplicate film and the original film being fed together over a transparent cylinder in a lamp house, an opaque slotted cylindrical sleeve surrounded by the cylinder and a lamp within the sleeve. The films are held in contact with the cylinder by an endless belt driven synchronously with the take up spools for the films, a sensing finger being mounted to engage the original film as it is taken up by the delivery spool to stop the apparatus a predetermined interval after the last image on the film. The duplicate film in the magazine operates a meter to register the length of film remaining on the spool in the magazine.

The provision of the magazine gives a considerable saving in duplicate film as the film is severed as soon as the images on the original film stop irrespective of whether the whole length of original film contains exposure.

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–4 is confirmed.

New claim 5 is added and determined to be patentable.

*5. Apparatus for the production of duplicate micro and other films from original films comprising a base board, a spindle passing through the base board, a spool containing an original developed film mounted on the spindle, a second spindle, a magazine containing a duplicate film mounted therein of substantially greater length than the original film, a light tight casing enclosing the magazine, a lamp-house, a lamp in the lamp-house, a transparent cylinder surrounding the lamp and a slotted opaque sleeve interposed between the lamp and the cylinder, an endless belt passing over the cylinder, motor means for driving the endless belt, the endless belt maintaining the films in contact with one another and the cylinder thus to prevent the films from slipping relative to each other, roller means over which the endless belt passes, two take up rollers for the two films, the motor means also driving the two take up rollers, a sensing roller contacting the film in the magazine to measure the film as it unwinds, a meter to show the remaining film in the magazine, and a sensor for stopping the apparatus after the last image on the original fim has been exposed.*

* * * * *